April 1, 1952     E. P. BRUS     2,591,131
PORTABLE ELECTRIC SERVICE LAMP
Filed May 2, 1949
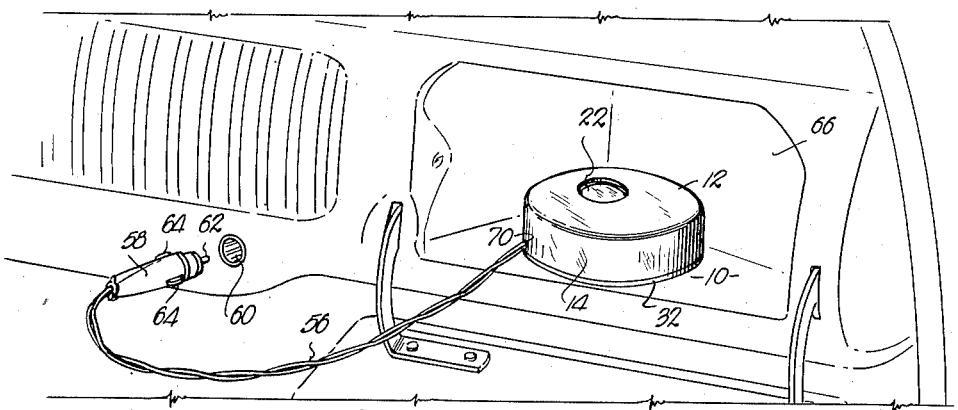
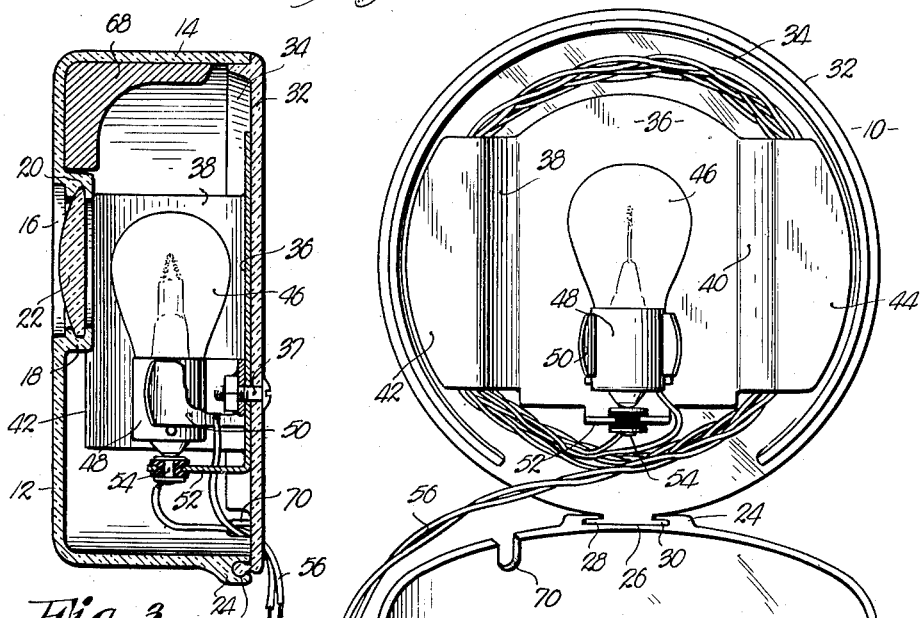
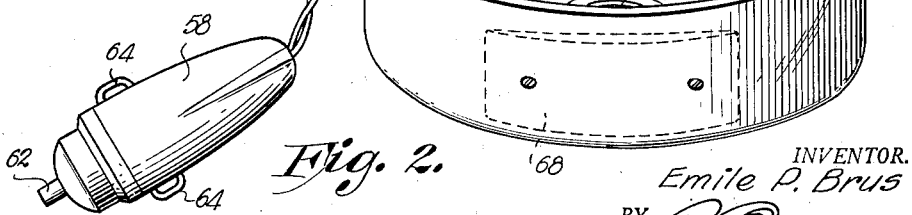
INVENTOR.
Emile P. Brus
BY
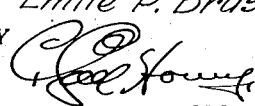
ATTORNEY.

UNITED STATES PATENT OFFICE 2,591,131

PORTABLE ELECTRIC SERVICE LAMP

Emile P. Brus, Kansas City, Mo.

Application May 2, 1949, Serial No. 90,980

1 Claim. (Cl. 240—8.18)

This invention relates to a service light particularly adapted for use with an automobile or other vehicle or the like, having a source of electric current, the primary object being to provide a relatively small, compact unitary article that may be carried within the small glove compartment of the automobile and extended from a point of connection with the conventional cigarette lighter of the automobile to a point of use.

It is the most important object of the present invention to provide a service light of a portable nature including a hollow container having a lid therefor, the lid being in turn provided with a reflector that has mounted thereon a lamp unit, having a conductor, the reflector being formed to serve the secondary purpose of providing a reel or drum for receiving the conductor in coiled relationship thereto.

Another important object of the present invention is to provide a service light of the above mentioned character wherein the reflector that is positioned on the inner face of the container lid has a pair of opposed, laterally extending legs to present a drum-like structure for receiving the lamp cord and each of the legs is provided with out-turned flanges for holding the cord in place on the reflector.

Other objects of the present invention include the manner in which the entire unit is properly weighted, whereby the same may be moved to a given position and held in place; the way in which the lamp unit of the device may be used either with the lid in an open condition or closed; the manner of providing an opening in one wall of the container with a lens therein for receiving rays of light from the lamp when the container is closed; and many other more minor details of construction all of which will become apparent as the following specification progresses, reference being had to the accompanying drawing, wherein:

Figure 1 is a perspective view of a portable electric service lamp made in accordance with my present invention showing the same positioned in a convenient manner within an automobile glove compartment.

Fig. 2 is a perspective view showing the lamp with the lid thereof open; and

Fig. 3 is a substantially central cross-sectional view through the service lamp with the lid thereof in a closed condition.

A hollow container 10, takes much the same form as a cup in that there is provided a flat end wall 12 having a continuous laterally projecting side wall 14.

Wall 14 is preferably circular but the contour of the entire container 10 may be changed as desired. Wall 12 is provided with an opening 16 and an inturned annular flange 18 that completely circumscribes opening 16. Flange 18 is in turn provided with an annular groove 20 for receiving a transparent lens 22.

An external boss 24 is formed on the wall 14 of container 10 adjacent the uppermost edge thereof having a cavity 26 for receiving a pair of opposed pintles 28 and 30 that are formed on the edge of a lid 32. The boss 24 may be moulded around the pintles 28 and 30 or otherwise connected thereto in a manner to permit free rotation of pintles 28 and 30 and thereby presenting a hinge for securing lid 32 to body 10. Lid 32 is circular, as shown in Fig. 2, and completely covers the open end of the body 10 opposite to wall 12.

An inturned flange 34 is formed on the innermost face of the lid 32 that extends into the body 10 when the lid 32 is in the closed condition. The innermost face of lid 32 has a reflector 36 removably secured thereto through the medium of a bolt 37, said reflector 36 having a pair of opposed laterally extending legs 38 and 40.

A pair of out-turned flanges 42 and 44 form an integral part of the legs 38 and 40 respectively. It is to be noted that the outermost edges of the flanges 42 and 44 terminate inwardly with respect to the periphery of lid 32 to the end that when the latter is in the closed condition, the reflector 36 and its component parts will be entirely disposed within the container 10.

As noted in Fig. 3 of the drawing, when lid 32 is closed, the flange 18 on wall 12 is positioned between the legs 38 and 40 of reflector 36.

An electric lamp 46 adjacent the innermost face of the reflector 36 and between the legs 38 and 40 thereof, is mounted within a conventional socket 48 that is in turn held in place by a resilient clip 50. Clip 50 is U-shaped and secured directly to the innermost face of the reflector 36 by means of bolt 37 passing through the bight thereof.

The opposed legs of clip 50 partially encompass the socket 48 for releasably mounting the same. One edge of the reflector 36 is provided with a lateral extension 52 extending inwardly with respect to the lid 32 and terminating in underlying relationship with respect to the lamp 46. The outermost free end of the extension 52 has an insulated terminal 54 for making electrical contact with the lamp 46 by direct engagement therewith.

An extension cord 56 has a pair of conductors, one of which is joined directly to the terminal 54 and the other has connection with the clip 50 as clearly illustrated in Fig. 3. That end of the extension cord 56 opposite to the terminal 54 and the clip 50 is provided with a plug 58 adapted to be received by the dashboard opening 60 of an automobile presented by removal of the conventional cigar or cigarette lighter thereof.

One of the conductors of the cord 56 is connected directly to a probe 62 forming a part of the plug 58, while the other conductor is joined within plug 58 to the metal-like casing thereof. Consequently, when the plug 58 is inserted within the opening 60, electrical connection will be established for illuminating the lamp 46.

As is well known, the electrical socket 60 is provided with yieldable portions for receiving the plug 58 and accordingly, the latter is provided with ears 64 for holding plug 58 in place within the opening 60. Since the entire unit is relatively small, the same may conveniently be carried within the glove compartment 66 of an automobile in the manner illustrated in Fig. 1 of the drawing.

When it is desired to place the service lamp in use, the operator simply opens the lid 32 and unwinds the cord 56 from its normal position coiled about the legs 38 and 40 of reflector 36. The plug 58 can then be inserted into the socket opening 60 and the body 10, together with its lid 32, may be moved to a desired point of use. A relatively tight fit should be provided between the pintles 28 and 30 and the cavity 26 to the end that the lid 32 will assume a position similar to that shown in Fig. 2 or like angles with respect to wall 12.

As a counter-balancing means, a weight 68 is provided in the body 10 and with proper choosing of weight 68 and correct positioning thereof in opposed relationship to the hinge for lid 32, body 10 will not tip when used in the manner shown in Fig. 2.

The service light may, also, be used with the lid 32 in a closed condition as illustrated in Fig. 3. When so used, the cord 56 passes through a slot 70 provided in wall 14. The positioning of lamp 46 is important. The center of the filament should be on the extended axis of lens 22, and the lamp should be relatively close to the said lens for the purpose of concentrating the rays into a long, narrow, projected beam which develops a bright pattern at a considerable distance. It is unnecessary to employ a reflector of a particular type when the lamp and lens are so arranged.

When the device is not in operation and stored in the glove compartment 66 of the automobile, cord 56 is coiled about the legs 38 and 40 and the flanges 42 and 44 will retain the coiled cord in place and permit lid 32 to close. The plug 58 may remain without the confines of body 10, even though the cover be closed, for there is sufficient clearance for the cord when it occupies a position in opening 70. There is an adequate amount of space adjacent the terminal 54 in body 10 for accommodating plug 58.

The material from which the case of the device is made is translucent; and, when the lamp therein is burning, the entire case will emit a red glow and thereby form a warning signal if the device is placed on or near the automobile. It has, also, been found useful to place the device near the license plate of the automobile with the white rays of light passing through lens 22 directed against the license plate while the red glow of the case constitutes a stop light or analogous means.

Manifestly, many details of construction of the service lamp forming the subject matter hereof may be changed without departing from the spirit of this invention as defined by the scope of the appended claim.

Having thus described the invention, what is claimed as new and desired to be secured by Letters Patent is:

In an electric service lamp, a combination light reflector, electric cord holder and lamp-receiving unit including a flat support; a U-shaped member having a polygonal, flat bight and a pair of spaced legs extending outwardly from one face thereof and diverging as the outermost ends thereof are approached; an outwardly extending flange on said outermost end of each leg respectively; an electrical contact mounting extending outwardly from said face of said bight between said legs; a clip for holding a lamp in engagement with said contact; and means common to the clip and the member for attaching the clip to said one face of the bight and attaching the opposite face of the bight to said support with the flanges spaced from the latter, whereby said flanges and the support are adapted to hold an electric cord in place when coiled about said legs.

EMILE P. BRUS.

REFERENCES CITED

The following references are of record in the file of this patent:

UNITED STATES PATENTS

| Number | Name | Date |
|---|---|---|
| 1,334,995 | Garl | Mar. 30, 1920 |
| 1,363,417 | Hunt | Dec. 28, 1920 |
| 1,451,122 | Stahl | Apr. 10, 1923 |
| 1,647,011 | Morgan | Oct. 25, 1927 |
| 1,656,648 | Ritz Woller | Jan. 17, 1928 |
| 1,889,188 | Bean | Nov. 29, 1932 |
| 1,956,273 | Cleburne | Apr. 24, 1934 |
| 2,233,377 | Talbot | Feb. 25, 1941 |
| 2,236,435 | Lockshin | Mar. 25, 1941 |
| 2,447,403 | Forbes | Aug. 17, 1948 |
| 2,458,721 | Nenno | Jan. 11, 1949 |
| 2,482,543 | Jackson et al. | Sept. 20, 1949 |
| 2,511,893 | Alden | June 20, 1950 |